United States Patent [19]

Jeffrey et al.

[11] 3,717,260
[45] Feb. 20, 1973

[54] DRAFT GEAR AND COUPLER POSITIONING APPARATUS FOR A VEHICLE

[75] Inventors: William B. Jeffrey, Irwin; Richard K. Frill, Pittsburgh, both of Pa.

[73] Assignee: Westinghouse Air Brake Company, Urlmerding, Pa.

[22] Filed: March 16, 1971

[21] Appl. No.: 124,861

[52] U.S. Cl. .........................213/14, 213/20, 213/21, 213/40 R, 213/61, 213/64
[51] Int. Cl. ............................B61g 5/00, B61g 7/12
[58] Field of Search.........213/1.3, 12, 14, 16, 18, 19, 213/20, 22, 40, 45, 69, 75, 76, 21, 61–67

[56] References Cited

UNITED STATES PATENTS

| | | | |
|---|---|---|---|
| 3,402,826 | 9/1968 | Clejan et al. | 213/16 |
| 3,349,926 | 10/1967 | Cope | 213/16 |
| 3,610,434 | 10/1971 | Herbert | 213/62 R |
| 2,802,581 | 8/1957 | Larsson | 213/62 R |
| 1,645,361 | 10/1927 | Tomlinson | 213/64 |
| 2,250,425 | 7/1941 | Van Dorn | 213/62 R |
| 3,515,288 | 6/1970 | Frill et al. | 213/62 R |

*Primary Examiner*—Drayton E. Hoffman
*Attorney*—Ralph W. McIntire, Jr.

[57] ABSTRACT

This invention relates to a draft gear device for rapid transit passenger cars in which the cushioning member constitutes a rubber or other elastomeric element subject to shear in response to the application of both draft and buff forces to a car coupler. The rubber or elastomeric element is bonded to a pair of parallel spaced-apart plates that constitute the shank of a car coupler and a third plate disposed therebetween and integral with one side of a hub of a drawbar. Extending from the opposite side of this hub, which has a pivotal connection with the car underframe, is a fan-shaped coupler-carrier element between which and the car underframe is a pair of spaced-apart resilient support elements that are normally effective to bias the car coupler to a horizontal position and provide for a limited vertical movement therefrom in either direction or for horizontal angular movement of the drawbar and coupler about their pivotal connection with the car underframe. Release means in the form of tension-breakable bolts are provided between the drawbar and the underframe which bolts break upon the application of excessive buff forces to provide for movement of the drawbar relative to the underframe until the anticlimbing plates on two adjacent cars are moved into engagement one with the other.

8 Claims, 4 Drawing Figures

DRAFT GEAR AND COUPLER POSITIONING APPARATUS FOR A VEHICLE

BACKGROUND OF THE INVENTION

Conventional draft gear devices for rapid transit passenger cars comprise a rubber or other elastomeric cushioning unit interposed between a drawbar and a coupler yoke so as to be subject to a compressive force in response to the application of draft and buff forces applied to a car coupler which has a shank that is resiliently supported on a carrier element located beneath the shank and suitably secured to the car underframe.

The conventional-type of draft gear device and coupler-carrier element cannot conveniently be employed on many of the new types of lightweight rapid transit passenger cars due to the limitations of space for the cushioning element of the draft gear and also the coupler-carrier element.

Accordingly, it is the general purpose of this invention to provide a draft gear device for each car coupler used on rapid transit-types of passenger cars which draft gear devices embody a cushioning element in which rubber or some elastomeric material is subject to shear in response to the application of either a draft or a buff force to the car coupler, and the usual sector bar or carrier element that supports the coupler shank between the coupler and the pivotal connection of the drawbar to the car underframe is replaced by a pair of spaced-apart resilient cylindrical members interposed between the car underframe and a flat fan-shaped element integral with and extending in one direction from a hub of a drawbar that has extending in the opposite direction from this hub a plate to which the rubber or elastomeric material of the cushioning element is bonded.

SUMMARY OF THE INVENTION

According to the present invention, a novel and compact draft gear device is provided for each car coupler that is used on rapid transit-types of passenger cars, which devices embody a drawbar having a hub mounted on a ball and socket to provide limited universal movement with respect to a pin carried by the car underframe and passing through a bore in the ball. Extending in each direction from this hub is a flat horizontal plate to each of the opposite sides of one of which is bonded one face of one of a pair of rectangular solid members constructed of rubber or some elastomeric material, the opposite parallel face of each of these solid members being bonded to a pair of spaced-apart parallel plates that at one end are provided with flanges that may be secured to a car coupler. The upper side of the other horizontal plate, which is fan-shaped and constitures a coupler-carrier element, abuts the lower side of two spaced-apart metallic piston-like members, each having extending from its upper side a rod that has a pivotal connection with a clevis formed at one end of a corresponding anchor member that has its opposite end bonded to one of a plurality of spaced-apart resilient support elements constituting a stack. Each stack at its other end is secured to a carriage member connected by tension-breakable bolts to the car underframe, which bolts break upon the application of excessive buff forces to allow engagement of the anticlimbing plates on two adjacent cars.

Figure 2:
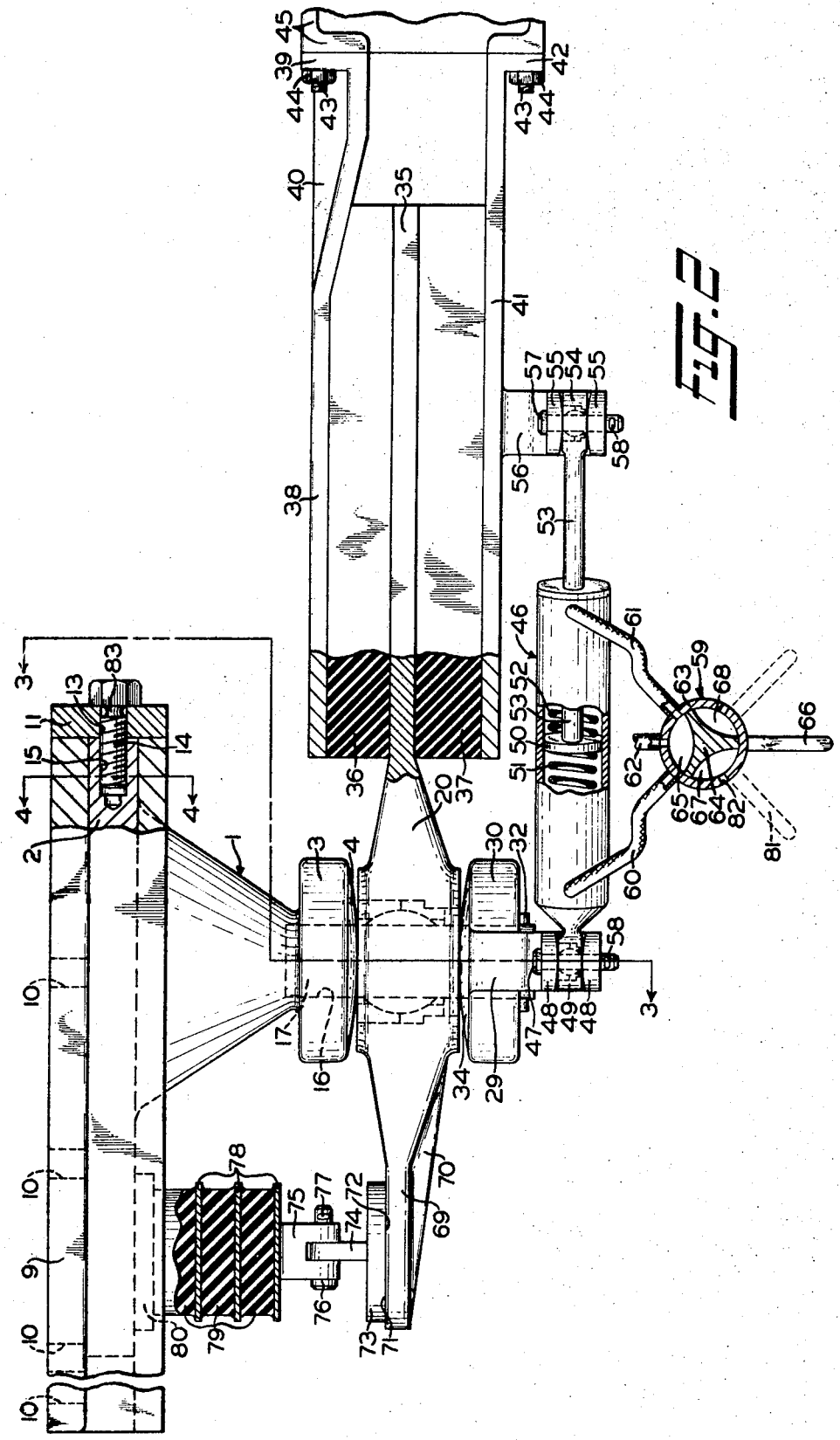
FIG. 2 is an elevational view, partly in section, of the draft gear apparatus shown in FIG. 1.
Figure 3:
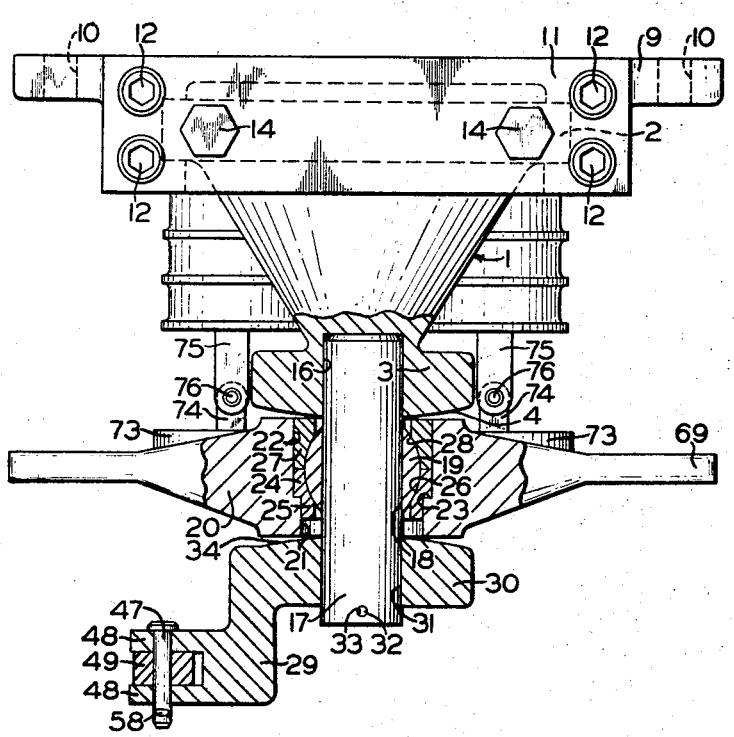
Figure 4:
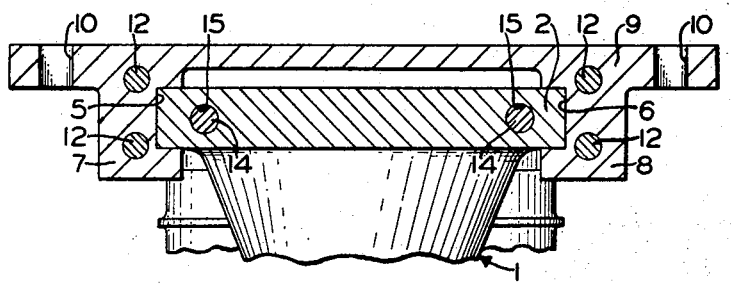

FIG. 3 is an elevational cross-sectional view, taken along the line 3—3 of FIG. 2 and looking in the direction of the arrows, showing the construction and arrangement of a pivotal connection between a drawbar and a carriage member releasably carried by the underframe of a rapid transit-type of railway passenger car. FIG. 4 is an elevational cross-sectional view, taken along the line 4—4 of FIG. 2 and looking in the direction of the arrows, showing how the carriage member is mounted on the car underframe so as to be movable with respect thereto upon the breakage of a pair of tension-breakable bolts that extend through a stop member that abuts the underframe and have screw-threaded engagement with screw-threaded bottomed bores in the carriage member.

There is shown in FIGS. 1, 2, 3 and 4 of the drawings a cushioned draft gear apparatus which is constructed in accordance with the invention, the cushioning being provided by rubber or other elastomeric material when subject to a shear force. This draft gear apparatus comprises a carriage member 1 that is in the form of an inverted truncated cone which has integral therewith at its upper or larger end a rectangular-shaped slide element 2 and its lower or smaller end a cylindrical boss 3 that has formed thereon a spherical surface 4. As best shown in FIG. 4, the slide element 2 is carried in a pair of grooves 5 and 6 that are provided in a pair of spaced-apart legs 7 and 8 that extend downward from a bracket element 9 which is provided with a plurality of bores 10. This bracket element 9 may be secured to the underframe (not shown) of a railway car by a plurality of cap screws (not shown) that extend through the bores 10 and have screw-threaded engagement with screw-threaded bores provided in the underframe. The grooves 5 and 6 extend from end to end of the bracket element 9 in order that the slide element 2 may be inserted into either end of these grooves in assembling the draft gear apparatus.

Figure 1:
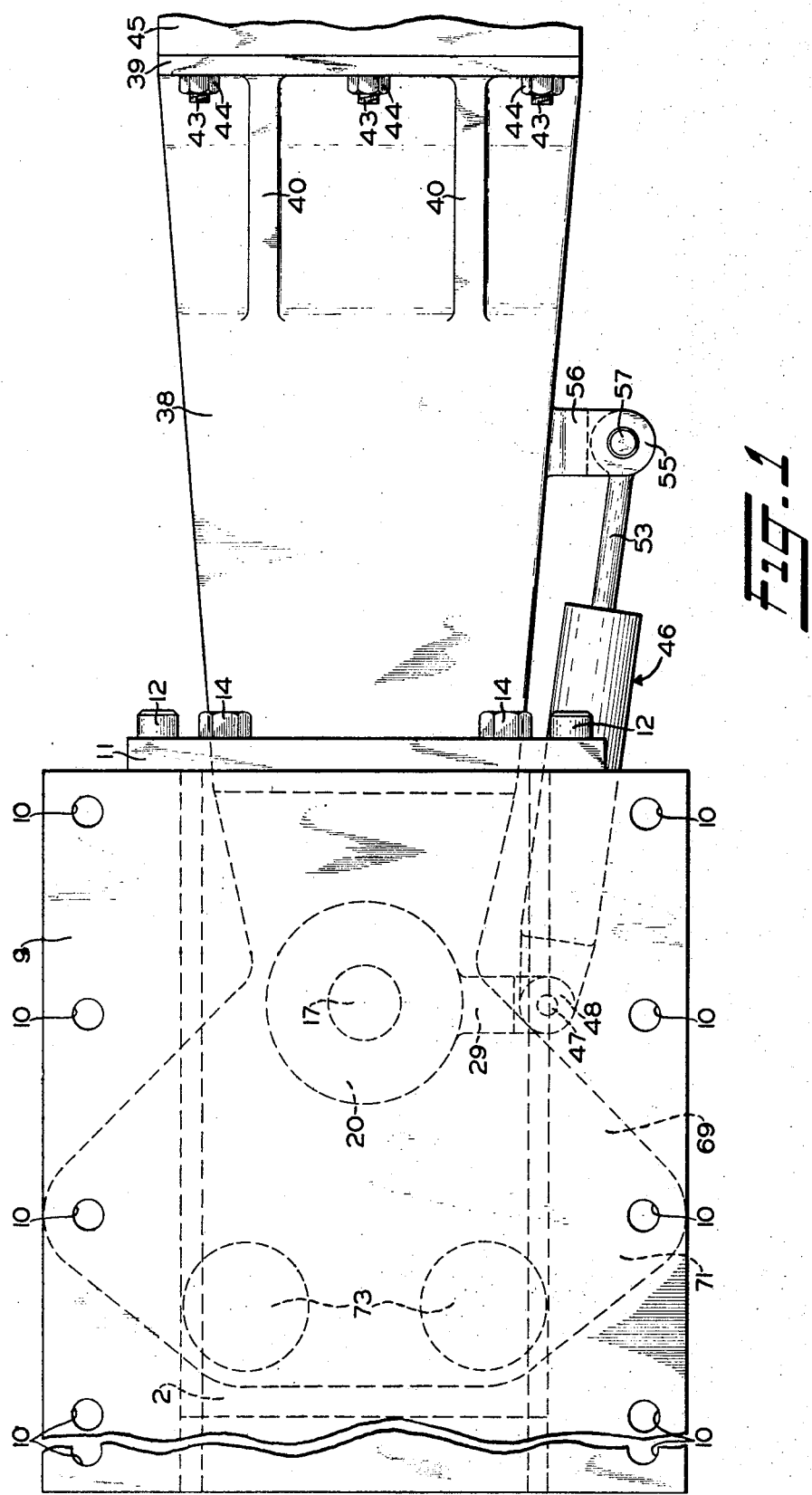
FIG. 1 is a plan view of a novel draft gear apparatus for a rapid transit-type of railway passenger car.

Subsequent to inserting the slide element 2 into the grooves 5 and 6, the right-hand end of these grooves, as viewed in FIGS. 1 and 2, is closed by a rectangular stop member 11 which is secured to the bracket element 9 by such as, for example, four socket-type cap screws 12 (FIG. 3) that extend through smooth bores (not shown) in the stop member 11 and have screw-threaded engagement with screw-threaded bottomed bores in bracket element 9.

The stop member 11 is provided with a pair of spaced-apart parallel smooth bores 13, one of which appears in FIG. 2, for receiving a pair of tension-breakable bolts 14 that have screw-threaded engagement with a pair of screw-threaded bottomed bores 15 provided in the slide element 2.

As best shown in FIG. 3 of the drawings, the cylindrical boss 3 of the carriage member 1 is provided with a bottomed bore 16 into which is press-fitted a pintle 17 that extends through a bore 18 in a ball 19 of a ball and socket joint now to be described.

As shown in FIG. 3, a hub 20 is provided with a bore 21 and a coaxial counterbore 22. The lower end of the counterbore 22 forms a shoulder 23 against which rests a collar 24 formed on the upper end of a lower member 25 of a two-piece split bushing. Subsequent to inserting this lower member 25 into the bore 21, the ball 19 is placed in a spherical cavity 26 formed in this member 25 so that the axis of the bore 18 in this ball is parallel to the axis of the bore 21 in the hub 20. Thereafter, an upper member 27 of the two-piece split bushing is pressed into the upper end of the counterbore 22 until a spherical cavity 28 therein abuts the spherical surface of the ball 19.

Now the hub 20 may be mounted on the pintle 17 by aligning the bore 18 in the ball 19 with the pintle and then shoving the hub onto the pintle.

Next, an off-set lever 29 having a cylindrical boss 30 at one end through which extends a bore 31 is mounted on the pintle 17 after which a pin 32 is pushed into a bore 33 provided in the pintle 17 adjacent the lower end thereof, it being noted that the upper side of the boss 30 has a spherical surface 34 formed thereon which has substantially the same radius as the spherical surface 4 formed on the boss 3.

Referring to FIGS. 1 and 2, it may be noted that formed integral with the hub 20 and extending therefrom in the direction of the right hand is a flat plate 35 which, together with the hub 20, constitutes a drawbar of a car coupler. As shown in FIG. 2, bonded to the respective upper and lower sides of the flat plate 35, is a pair of cushion elements 36 and 37 which are formed of some suitable kind of rubber or elastomeric material capable of resisting in shear the draft and buff forces to which the draft gear apparatus must be subject to when in use on a rapid transit railway car. Furthermore, as shown in FIGS. 1 and 2, bonded to the upper side of the cushion element 36 is a substantially flat plate 38 which at its right-hand end is provided with an out-turned flange 39 and a pair of ribs 40. Likewise, bonded to the lower side of the cushion element 37 is a flat plate 41 that at its right-hand end is provided with an out-turned flange 42.

Secured to the flanges 39 and 42 by a plurality of studs 43 and nuts 44 is a rapid transit-type of railway passenger car coupler 45 which, for example, may be such as the car coupler shown and described in U.S. Pat. No. 3,280,990, issued Oct. 25, 1966, to William B. Jeffrey and Richard K. Frill, and assigned to the assignee of the present application.

In order to swing the coupler 45 to a position in which its coupler guide pin (not shown) will enter the aligning funnel of a coupler on an adjacent railway car, or to swing this coupler 45 about pintle 17 in either direction from the position shown to the position this coupler occupies while the end of the car on which the coupler is carried is not coupled to another car, a manually controlled fluid pressure operated coupler positioning means is provided which comprises a double-acting fluid motor 46 that is mounted at one end on the hereinbefore-mentioned off-set lever 29 by means of a headed pin 47 that extends through coaxial bores provided in the jaws of a clevis 48 formed on the outer end of the lever 29 and in a ball of a ball and socket joint carried in a boss 49 integral with the left-hand end of fluid motor 46, it being understood that the construction of this ball and socket joint is substantially the same as that of the hereinbefore-mentioned ball and socket joint comprising the ball 19 and members 25 and 27 of the two-piece split bushing. A piston 50 of the fluid motor 46 is normally biased to a center position, as shown in FIG. 2, by a pair of springs 51 and 52, one disposed on each side thereof.

A piston rod 53 that at its left-hand end is integral with the piston 50 has a boss 54 formed on its right-hand end. This boss 54 carries therein a ball and socket joint, the construction of which is substantially the same as that of the ball 19 and the two-piece split bushing hereinbefore mentioned. The boss 54 is disposed between the jaws of a clevis 55 formed on the outer end of a bracket 56 that is integral with the flat plate 41 and is operatively connected thereto by means of a headed pin 57 that extends through coaxial bores (not shown) provided in the jaws of the clevis 55 and in the ball carried in the boss 54. This headed pin 57, as well as the hereinbefore-mentioned headed pin 47, is provided adjacent its lower end with a bore (not shown) for receiving therein a cotter pin 58 which prevents removal of the respective headed pin by vibration when the railway car is traveling at a high speed.

The opposite sides of the piston 50 of the fluid motor 46 are connected to a manually operated control valve device 59 by a pair of flexible hoses 60 and 61. The valve device 59 is connected to a suitable source of fluid under pressure such as, for example, a storage reservoir (not shown) on the respective passenger car by a pipe 62. The valve device 59 may be suitably mounted in any convenient location on the railway car and comprises a body 63 in which is rotatably mounted a valve element 64. While the valve element 64 occupies the position shown in FIG. 2, fluid under pressure is supplied from the storage reservoir on the car to both sides of the piston 50 of the fluid motor 46 via pipe 62, a first cavity 65 in the valve element 64 and the hoses 60 and 61. With fluid under pressure thus supplied to both sides of the piston 50, the springs 51 and 52 are effective to bias this piston 50 to its center position shown in FIG. 2. While the piston 50 occupies its central position, it is effective via the piston rod 53, boss 54, pin 57, clevis 55, bracket 56 and plate 41 to maintain the car coupler 45 in its central position as shown in FIG. 1.

The valve element 64 is connected to a multi-position handle 66 which, when this handle is swung to either of its two operating positions at the respective opposite sides of its neutral position in which it is shown in FIG. 2, connects, via one or the other of a second and a third cavity 67 and 68 in the valve element 64, one side of the piston 50 to atmosphere and the other to the storage reservoir on the car.

When one side of the piston 50 is thus vented to atmosphere while fluid under pressure is supplied to the opposite side, this piston is effective to swing the car coupler 45 about the pintle 17 in one or the other direction from the position shown in FIG. 1. Once the coupler 45 reaches the desired position, the handle 66 is moved to a lap position in which the supply of fluid under pressure from the storage reservoir is cut off from both sides of the piston 50 and the fluid on each side of this piston trapped on the respective side thereof to maintain the coupler 45 in the desired position. Thus, the coupler 45 can be moved into alignment with a corresponding coupler on an adjacent car prior to coupling the two cars, or this coupler can be swung in either direction from the position shown in FIG. 1 through an arc of, for example, 50° to a position in which the coupler is carried when it is at that end of a railway car that constitutes either the front end or the back end of a train.

As shown in FIGS. 1 and 2 of the drawings, formed integral with the hub 20 and extending therefrom in the direction of the left hand is a flat fan-shaped coupler-carrier element or sector bar 69 that on its lower side is provided with a strengthening rib 70 to increase its rigidity. The left-hand end of the sector bar 69 has formed on its upper side, as by machining, a smooth flat surface 71 that abuts a like flat surface 72 formed, as by machining, on the lower side of each of a pair of cylindrical members or support pads 73, only one of which appears in FIG. 2. A suitable lubricant may be placed between surfaces 71 and 72. Formed integral with the upper side of each cylindrical member 73 is a link 74 that has its upper end disposed between the jaws of a clevis 75 and operatively connected thereto by a headed pin 76 that is provided adjacent its right-hand end, as viewed in FIG. 2, with a bore (not shown) for receiving a cotter pin 77 which prevents removal of the respective pin 76 by vibration.

Each clevis 75 is integral with and extends from the lower side of a metallic plate 78 that has bonded to its upper side the lower side of the lower one of three cushion elements 79 arranged in a stack and having between each adjacent pair a metallic plate identical to the plate 78, except for the omission of the clevis 75, and denoted by the same reference numeral. Each of the cushioning elements 79 is a solid construction of some suitable kind of rubber or elastomeric material, the upper element 79 having bonded to its upper side the lower side of a metallic plate 80 that has its upper side secured to the lower side of slide element 2 by some suitable means such as, for example, welding. Thus, the two spaced-apart stacks of cushioning elements 79 serve to normally bias the draft gear apparatus and car coupler 45 to a substantially horizontal position, as shown in FIG. 2, and, in cooperation with the ball 19 (FIG. 3), provide for limited clockwise rocking, as viewed in FIG. 2, of this draft gear apparatus and the coupler 45 about this ball 19 against the yielding resistance of the two stacks of cushioning elements 79, or counterclockwise rocking about this ball 19 so that the surface 71 on the coupler-carrier element 69 is moved downward and out of abutting contact with the surface 72 on each of the cylindrical members 73. Furthermore, these two stacks of cushioning elements 79 cooperate with the ball 19 and its socket, constituted by the spherical cavities 26 and 27 (FIG. 3) in the members 25 and 27 which form a split bushing, to provide limited universal movement of the draft gear apparatus and the coupler 45 to enable proper alignment of two such couplers on two adjacent railway passenger cars prior to coupling these cars.

OPERATION

Assuming that two railway passenger cars that are to be coupled are provided at each end thereof with a car coupler of the type shown and described in hereinbefore-mentioned U.S. Pat. No 3,280,990, it should be noted that if the misalignment of the two couplers at the adjacent ends of two cars that are to be coupled is less than 4 inches in any direction, the tapered portion of the coupler guide pin of each coupler will enter the aligning funnel of the other coupler and the two couplers can be properly coupled. However, should the misalignment of the two couplers that are to be coupled be in excess of 4 inches, this misalignment can be reduced to a value less than 4 inches by effecting swinging one of the couplers 45 (FIG. 1) about its pintle 17 in a manner now to be described.

Let it be assumed that in order to swing the coupler 45 shown in FIG. 1 to a position in which the misalignment of its coupler guide pin (not shown) with the aligning funnel of the adjacent car coupler is less than 4 inches, it is necessary to swing this coupler 45 from the position shown in FIG. 1 in a clockwise direction about the pintle 17. To effect swinging of the car coupler 45 in a clockwise direction about the pintle 17, a trainman will manually move the handle 66 of the control valve device 59 (FIG. 2) in a clockwise direction from the position shown in FIG. 2 to the position indicated in dotted lines and denoted by the reference numeral 81.

As the handle 66 is thus rotated in a clockwise direction to the position indicated by the reference numeral 81, the valve element 64 is likewise rotated from the position shown in FIG. 2 to a position in which the cavity 65 maintains a fluid pressure supply communication between the supply pipe 62 and the hose 61, and the cavity 67 establishes a communication between the hose 60 and an exhaust port 82 provided in the body 63. Upon thus establishing a communication between the hose 60 and atmosphere, fluid under pressure will be exhausted from the left-hand face of the piston 50 to atmosphere via hose 60, cavity 67 and exhaust port 82 whereupon the fluid under pressure supplied from the storage reservoir on the car to the right-hand face of piston 50, via pipe 62, cavity 65 and hose 61, is rendered effective to move the piston 50 in the direction of the left hand against the yielding resistance of the spring 51.

As the piston 50 is thus moved in the direction of the left hand, the piston rod 53 is moved therewith to transmit a force to the headed pin 57. It is apparent from FIG. 1 of the drawings that this force transmitted to the pin 57 is effective to produce a moment that swings or rocks the car coupler 45 clockwise, as viewed in FIG. 1, about the pintle 17.

The trainman, by observation, can determine when the coupler 45 has been swung in a clockwise direction about the pintle 17 far enough for the coupler guide pin on this coupler 45 to enter the aligning funnel on the adjacent coupler. Consequently, upon the coupler 45 reaching the desired position, the trainman will rotate the handle 66 clockwise from the position indicated by the reference numeral 81 to a lap position in which valve element 64 closes communication between the pipe 62 and both of the hoses 60 and 61 and between both hoses and atmosphere.

Coupling of the two adjacent cars can now be effected by moving one of the two cars toward the other thereby causing automatic operation of the two car couplers to couple the two adjacent cars one to the other.

It is apparent that the moving car has a certain amount of kinetic energy. Consequently, as the couplers on the adjacent ends of the moving car and the standing car come into contact, each coupler imparts and impact to the other, the impact imparted to each coupler by the other being the same.

Let it be assumed that the coupler 45 shown in FIG. 1 and 2 of the drawings is the car coupler on the standing car that is struck by the moving car. Therefore, upon collision of the moving car with the standing car, some of the kinetic energy of the moving car is transmitted from the coupler on the moving car through the coupler 45 and the flanges 39 and 42 on the struck car to the flat plates 38 and 41 and thence to the respective cushion elements 36 and 37 bonded thereto and to the flat plate 35, as aforestated, it being understood that the direction of the blow imparted as the result of this impact acts in the direction of the left hand, as viewed in FIGS. 1 and 2.

Since the cushioning elements 36 and 37 are bonded to the plates 38 and 41 and also to the plate 35, it is apparent that the plates 38 and 41 transmit the buffing force of impact of the two colliding cars to these cushioning elements which are constructed of a rubber or an elastomeric material to subject this material to a shearing force.

The American Society for Testing Materials in its Specification No. D–1566 defines rubber as follows:

"Rubber — A material that is capable of recovering from large deformations quickly and forceably and can be or already is modified to a state in which it is essentially insolvent (but can swell) in a boiling solvent, such as benzene, methyl ethyl ketone and ethonol-toluene azeothope.

"A rubber in its modified state free of dilutents retracts within one minute to less than 1.5 times its original length after being stretched at room temperature to twice its length and held for 1 minute before release."

Furthermore, Specification No. D–1566 defines an elastomer as follows:

"Elastomer — Macro-molecular material that returns rapidly to approximately the initial dimensions and shape after substantial deformations by a weak stress and release of the stress".

When the material of which the cushioning elements 36 and 37 is constructed is subject to a shearing force in the manner described above, it is stretched or elongated. It is an inherent property of rubber or any elastomeric material that it resists being stretched or elongated, and that when so stretched, develops an internal resistance or resisting force which acts in opposition to the force producing the elongation and prevents further elongation upon the two opposing forces becoming equal. Consequently, upon the collision of the moving car with the standing car, the plates 38 and 41 are moved in the direction of the left hand, as viewed in FIG. 2, relative to the plate 35 which remains stationary, it being assumed that the force of impact is not of sufficient magnitude to overcome the inertia of the standing or struck car, until the internal resisting force developed within the cushioning elements 36 and 37 is equal to the force of impact resulting from the collision of the moving car with the stationary car. The term inertia, as used above, is that characteristic possessed by a body or weight which is defined by Chamber's Technical Dictionary, edited by C. F. Tweney and L.E.C. Hughes, revised edition with supplement, published 1961, as follows:

"Inertia (Mech., Phys.) — Reluctance of a body to change its state of rest or of uniform velocity in a straight line. Inertia is measured by mass when linear velocities and accelerations are considered; and by moment of inertia (q.v.) for angular motions (i.e. rotations about an axis)."

Accordingly, the car having the car coupler 45, shown in FIGS. 1 and 2 at the right-hand end thereof, by reason of its inertia will, therefore, be reluctant to change its state of rest or, in other words, resist movement from its state of rest as the result of the kinetic energy transmitted to this coupler 45 of this standing car. Consequently, this kinetic energy transmitted to the plates 38 and 41 will cause movement of these plates and stretching or elongation of the rubber or elastomeric material comprising the cushioning elements 36 and 37 relative to the stationary plate 35.

Upon this movement of the plates 38 and 41 and stretching of the material comprising the cushioning elements 36 and 37 relative to the stationary plate 35, the internal resistance of these cushioning elements is correspondingly increased until there is thus provided automatically a force that is equal in magnitude and opposite in direction to the buffing force imparted to the coupler 45 on the stationary car upon collision of the moving car with the stationary car. This stretching of the material comprising the cushioning elements 36 and 37 when subject to a shear force resulting from the collision of a moving car with a stationary car is responsible for storing in the cushioning elements 36 and 37 an amount of kinetic energy that is dependent on the size of these cushioning elements and the kind of material from which they are made. Accordingly, subsequent to selection of the material from which the cushion elements are to be made, the size of these elements is so chosen that the kinetic energy that may be stored in the cushioning elements 36 and 37 by stretching of these elements when subject to a shear force resulting from the collision of a moving car with a stationary car is less than that required to break the hereinbefore-mentioned pair of tension-breakable bolts 14.

It may be assumed that the pair of tension-breakable bolts 14 are designed to break as the result of being subjected to a force in tension upon the application of a buff force to the car coupler 45 of, for example, 50,000 pounds. Therefore, when a buff force exceeding this value is applied to the car coupler 45, the cushioning elements 36 and 37 store therein the amount of kinetic energy for which they are designed, after which a sufficient buff force is transmitted to the slide member 2 via plate 35, hub 20, pintle 17, and carriage member 1 to cause the pair of tension-breakable bolts 14 to break at the location of the reduced diameter portion adjacent their heads and denoted in FIG. 2 of the drawings by the reference numeral 83.

Subsequent to the breakage of the pair of tension-breakable bolts 14, the slide element 2, carriage member 1, pintle 17, hub 20, the draft gear apparatus comprising the cushioning elements 36 and 37 and plates 35, 38 and 41, and the car coupler 45 are free to move in the direction of the left hand, as viewed in FIGS. 1 and 2, as the slide element 2 is guided in the grooves 5 and 6 (FIG. 4) until the anticlimbing plates (not shown) on the adjacent ends of the two coupled cars engage one with the other to prevent telescoping of these cars.

Let it be assumed that a railway passenger car provided with the draft gear apparatus constituting the present invention and a car coupler 45 at each of its ends is coupled in a train.

Now, let it be supposed that the train is standing and the engineer desires to start it. To do so, he moves the controller handle from idle position to a power position. This effects the supply of power to the driving wheels of the locomotive to start it from a stopped position. The initial movement of the locomotive is transmitted from the coupler at the train end of the locomotive to the coupler at the locomotive end of the first car in the train. Accordingly, let it be supposed that the coupler at the locomotive end of this first car is the coupler 45, shown in FIGS. 1 and 2 of the drawings. Therefore, the initial movement of the locomotive is effective to exert a pull or jerk and thereby establish a force that acts in the direction of the right hand on the coupler 45, shown in FIGS. 1 and 2. This force acting on the coupler 45 is transmitted through the studs 43, nuts 44, flanges 39 and 42, and plates 38 and 41 to the cushion elements 36 and 37 to subject these elements to a shearing force which acts in the direction of the right hand.

When the material of which the cushioning elements 36 and 37 is constructed subject to this shearing force, it is stretched or elongated in the manner hereinbefore described to develop an internal resisting force which acts in opposition to the force producing the elongation. Consequently, upon the application of a draft force to the coupler 45, the plates 38 and 41 are moved in the direction of the right hand, as viewed in FIG. 2, relative to the plate 35 until the internal resisting force developed within the cushioning elements 36 and 37 is equal to the draft force resulting from the initial movement of the locomotive.

Stretching of the material comprising the cushioning elements 36 and 37 is terminated upon the internal resisting force and the draft force becoming equal in magnitude and opposite in direction. Thereafter, a force is transmitted to the car underframe via plate 35, hub 20, pintle 17, carriage member 1, slide element 2, stop member 11, cap screws 12, and bracket element 9, which, as aforestated, is secured to the underframe. When this force becomes great enough to overcome the inertia of the standing car, the car will begin to move.

From the foregoing, it is apparent that for a given force applied to the coupler 45, either in buff or in draft, the draft gear apparatus constituting the present invention stores in the cushioning elements 36 and 37 the same amount of kinetic energy.

The operation of the draft gear apparatus associated with the car couplers at the adjacent ends of any two coupled cars in a train is the same as the operation of the draft gear apparatus associated with the coupler at the train end of the locomotive and the draft gear apparatus associated with the coupler at the locomotive end of the first car in the train. Therefore, a detailed description of the operation of the draft gear apparatus associated with the car couplers at the respective adjacent ends of two coupled cars is not deemed necessary.

Having now described the invention, what we claim as new and desire to secure by Letters Patent, is:

1. A draft gear and coupler positioning apparatus for a vehicle having an underframe, comprising:
   a. a vehicle coupler,
   b. a first means secured to said coupler,
   c. a second means carried by the underframe and comprising:
      i. a pintle carried by the underframe,
      ii. a ball having a bore therein through which said pintle extends,
      iii. a socket for receiving said ball, and
      iv. a hub mounted on said socket and rotatable therewith about said ball, said hub having integral therewith and extending in opposite directions therefrom a pair of arcuate-shaped arms each of which has formed thereon a substantially horizontal flat surface,
   d. resilient cushioning means so interposed between and secured to said first means and one of said pair of arms as to be operable to store energy therein upon being subjected to a shear force in response to the application of either a buff or a draft force to said coupler secured to said first means,
   e. a resilient support means interposed between the underframe and the other of said pair of arms for normally biasing said arms, said resilient cushioning means and said coupler to a substantially horizontal position, and
   f. a fluid pressure operated means for effecting rocking of said first means, said coupler, said resilient cushioning means and said hub about said pintle to position said coupler on the vehicle with respect to a coupler on an adjacent vehicle.

2. In a draft gear and coupler positioning apparatus for a vehicle, as recited in claim 1, further characterized in that said second means further comprises:
   a. a bracket element removably secured to said underframe and having integral therewith a pair of parallel spaced-apart legs in the adjacent sides of which are formed a pair of parallel grooves,
   b. a carriage member having formed at one end a slide element slidably mounted in said grooves, said carriage member being provided at its opposite end with a bottomed bore for receiving therein said pintle,
   c. a stop member removably secured to said bracket element at one end of said grooves in said legs, said stop member being provided with a plurality of spaced-apart holes therein, and
   d. a plurality of breakable bolts extending through said spaced-apart holes in said stop member and secured to said slide element and breakable in response to said shear force exceeding a chosen value to enable movement of said slide member in the direction of said shear force.

3. In a draft gear and coupler positioning apparatus for a vehicle, as recited in claim 1, further characterized in that said second means further comprises:
   a. a bracket element removably secured to said underframe and having integral therewith a pair of parallel spaced-apart legs in the adjacent sides of which are formed a pair of parallel grooves,
   b. a carriage member having formed at one end a slide element slidably mounted in said grooves, said carriage member being provided at its opposite end with a bottomed bore for receiving therein said pintle, c. a stop member removably secured to said bracket element at one end of said grooves in said legs, said stop member being provided with a plurality of spaced-apart holes therein, d. a plurality of breakable bolts extending through said spaced-apart holes in said stop member and secured to said slide element and breakable in response to said shear force exceeding a chosen value to enable movement of said slide member in the direction of said shear force, and e. a pair of spaced-apart support members, each having one end thereof disposed in friction contact with said flat surface on one of said arms, and f. said resilient cushioning means comprising a pair of resilient cushioning elements each pivotally connected at one end to one of said support members and having its opposite end anchored to said carriage member, said cushioning elements being effective to yieldingly resist rotation of said hub and socket in certain directions about said ball and ineffective in certain other directions.

4. In a draft gear and coupler positioning apparatus for a vehicle, as recited in claim 3, further characterized in that each of said cushioning elements comprises:

a. a plurality of elastomeric solids arranged in a pair of stacks, and b. a plurality of metallic plates, certain of which are disposed between each adjacent pair of said solids and bonded to the adjacent ends thereof and two of which are provided integral with one side thereof with a clevis for providing a pivotal connection with one of said pair of support members, the other side being bonded to the outer end of one of said solids at one end of one of said pair of stacks.

5. In a draft gear and coupler positioning apparatus for a vehicle, as recited in claim 3, further characterized in that each of said cushioning elements of said pair is subject to a compressive force upon rotation of said hub and socket in said certain directions, said compressive forces at one time being equal and at another time being unequal.

6. In a draft gear and coupler positioning apparatus for a vehicle, as recited in claim 3, further characterized in that said pair of cushioning elements, while said coupler of said vehicle is coupled to a like coupler of an adjacent vehicle, are effective to resist limited torsional movement of said socket and hub with respect to said ball in response to certain torsional forces imparted to said coupler on said vehicle by said like coupler on said adjacent vehicle.

7. In a railway car having a car underframe, and a car coupler, wherein the improvement comprises:

a. a hub having integral therewith and extending in opposite directions therefrom a pair of arms, b. means pivotally connecting said hub to said underframe, c. means carrying said car coupler, d. resilient cushioning means so interposed between and secured to said coupler-carrying means and one of said arms as to be operable to store energy upon being subject to a force in response to the application of either a buff or a draft force to said car coupler, and e. support means interposed between said underframe and said other arm for normally biasing said arms, said resilient cushioning means and said car coupler to a substantially horizontal position.

8. In a railway car, as recited in claim 7, further characterized in that said support means comprises:

a. a plurality of stacks of elastomeric solids, and b. a plurality of metallic plates, certain of which are disposed between each adjacent pair of solids in each of said stacks and bonded to the adjacent ends thereof and certain other of which are provided integral with one side thereof with a clevis, the other side being bonded to the outer end of one of said solids at one end of one of said stacks, and c. a plurality of members abutting said other arm and each having a pivotal connection with one of said clevises.

* * * * *